(12) United States Patent
Warren et al.

(10) Patent No.: US 7,389,159 B2
(45) Date of Patent: Jun. 17, 2008

(54) CONTROL ALGORITHM FOR BACKUP POWER SYSTEM

(75) Inventors: Donald Warren, Corinth, TX (US);
John Smith, Irving, TX (US)

(73) Assignee: Lennox Manufacturing Inc, Richardson, TX (US)

( * ) Notice: Subject to any disclaimer, the term of this patent is extended or adjusted under 35 U.S.C. 154(b) by 24 days.

(21) Appl. No.: 11/371,751

(22) Filed: Mar. 9, 2006

(65) Prior Publication Data

US 2007/0213876 A1   Sep. 13, 2007

(51) Int. Cl.
*G06F 19/00* (2006.01)
*G05D 23/00* (2006.01)
*G05D 11/00* (2006.01)

(52) U.S. Cl. ............ 700/295; 700/291; 700/296; 700/299; 700/300; 713/300; 713/320

(58) Field of Classification Search ............ 700/295, 700/300, 291, 296, 299; 713/300, 320
See application file for complete search history.

(56) References Cited

U.S. PATENT DOCUMENTS

| | | | |
|---|---|---|---|
| 3,657,021 A | | 4/1972 | Mathews |
| 4,349,148 A | | 9/1982 | Liberto et al. |
| 4,645,908 A | * | 2/1987 | Jones .................. 392/340 |
| 4,946,096 A | | 8/1990 | Ballard et al. |
| 5,395,042 A | * | 3/1995 | Riley et al. ............ 236/46 R |
| 5,427,086 A | | 6/1995 | Brownell |
| 5,579,197 A | | 11/1996 | Mengelt et al. |
| 5,622,310 A | | 4/1997 | Meyer |
| 5,804,889 A | | 9/1998 | Hu et al. |
| 5,809,449 A | * | 9/1998 | Harper .................. 702/63 |
| 6,169,340 B1 | | 1/2001 | Jones |
| 6,237,855 B1 | | 5/2001 | Stickney |
| 6,644,557 B1 | * | 11/2003 | Jacobs .................. 236/46 R |
| 6,647,501 B1 | * | 11/2003 | Ninomiya ............... 713/320 |
| 6,902,837 B2 | | 6/2005 | McCluskey et al. |
| 2004/0017199 A1 | * | 1/2004 | Kawakami .............. 324/433 |
| 2005/0116814 A1 | | 6/2005 | Rodgers et al. |

(Continued)

OTHER PUBLICATIONS

"Dual 1500kw Gen-Sets Provide Emergency Power and Peak Shaving", Daniel P. Rapp, Sep. 1, 1999.*

*Primary Examiner*—Michael D. Masinick
(74) *Attorney, Agent, or Firm*—David W. Carstens; Carstens & Cahoon, LLP

(57) ABSTRACT

A method for controlling fossil fuel fired heating systems according to an improved adaptive cyclical control method when operating on backup (auxiliary DC) electrical power. Battery life is prolonged when used in conjunction with such improved method. Operating characteristics of the heating equipment and home or building being heated are monitored and stored in electronic memory during normal periods of operation when grid power is available. These characteristics are used to create control algorithms that are in turn specific to the system, as defined by the heating equipment and conditioned space. When the grid power is lost the control algorithms select the optimal heating mode, determine optimal cycle duration, and estimate the time to exhaustion of the remaining backup power.

Operation is divided into sequential modes. When a prolonged low voltage period is detected, the backup power control initiates a short-term preliminary energy conservation mode. As the outage persists, the control transitions to intermediate and long-term energy conservation modes until the backup power is exhausted or grid power is restored.

14 Claims, 8 Drawing Sheets

U.S. PATENT DOCUMENTS

2005/0122653 A1 6/2005 McCluskey et al.
2006/0117775 A1* 6/2006 Dage et al. ................ 62/228.1
2007/0063676 A1* 3/2007 Davani ...................... 320/149

* cited by examiner

| Scenario | Outdoor Temp, F | Indoor Temp, F | Heat Mode, H/L | Indoor Set Point, F | "ON" Time per Hour, Mins | Cycles per Hour, # | "ON" Cycle, Mins:Secs | "OFF" Cycle, Mins:Secs | Heat Supplied, BTU/Hr |
|---|---|---|---|---|---|---|---|---|---|
| 0 | -30 | 74 | H | 75 | 60 | n/a | n/a | n/a | 93,334 |
| 1 | -20 | 74 | H | 75 | 57 | 14 | 4:00 | 0:17 | 88,667 |
| 2 | 0 | 74 | H | 75 | 45 | 11 | 4:00 | 1:27 | 70,000 |
| 3 | 20 | 74 | H | 75 | 33 | 8 | 4:00 | 3:30 | 51,333 |
| 4 | 50 | 74 | L | 75 | 25 | 2 | 7:30 | 22:30 | 23,333 |

| Outdoor Temp, F | Indoor Temp, F | Heat Loss, BTU/Hr | Average Operating Time per Hour, Mins |
|---|---|---|---|
| -20 | 55 | 61,364 | 34 |
| -10 | 55 | 53,182 | 30 |
| 0 | 55 | 45,000 | 25 |
| 10 | 55 | 36,818 | 20 |
| 20 | 55 | 28,636 | 16 |
| 30 | 55 | 20,455 | 11 |
| 40 | 55 | 12,273 | 7 |
| 50 | 55 | 4,092 | 2 |

*FIG. 3A*

| Outdoor Temp, F | Indoor Temp, F | Heat Loss, BTU/Hr | Average Operating Time per Hour, Mins |
|---|---|---|---|
| -20 | 75 | 88,667 | 57 |
| -10 | 75 | 79,333 | 51 |
| 0 | 75 | 70,000 | 45 |
| 10 | 75 | 60,667 | 39 |
| 20 | 75 | 51,333 | 33 |
| 30 | 75 | 42,000 | 27 |
| 40 | 75 | 32,667 | 21 |
| 50 | 75 | 23,333 | 15 |

*FIG. 3B*

CONTROL ALGORITHM FOR BACKUP POWER SYSTEM

BACKGROUND

1. Technical Field

This invention relates to a process or method for controlling fossil fuel (oil or gas) furnaces under conditions of unintentional electrical power outage or situations in which there is a desire to shed electrical load such as periods of peak demand on the electric power grid.

2. Description of Related Art

Occasionally it becomes desirable or necessary to rely on backup electrical power (BUP) systems for the operation of heating, ventilation and air conditioning (HVAC) equipment. Most HVAC systems become inoperative without such backup power. Normal fossil fuel furnace control schemes are most often focused on thermal comfort rather than conservation of electrical energy. As a result such furnaces operating under normal control scenarios do not optimize electrical power usage and thereby quickly deplete BUP systems.

A few prior art references describe control schemes for emergency or backup power operation of fossil fuel furnaces. U.S. Pat. No. 4,946,096 by Ballard et al. issued on Aug. 7, 1990 ("U.S. Pat. No. '096") discloses a control scheme for application of backup DC power to fossil fuel powered furnaces of that time period with blower and burner assemblies each having high and low settings. The control scheme restricts the furnace operation from a high heat mode during emergency power operation. As such U.S. Pat. No. '096 relies on switching to low heat mode and low circulating fan settings to reduce electrical power consumption. But, many of today's furnace designs operate more effectively, in terms of heat supplied to the conditioned space relative to the coincident electrical power usage, by remaining in a high heat mode and reducing the number of on and off cycles. As a result there remains a need to control fossil fuel powered furnaces in a manner that optimizes the heat supplied relative to the electrical energy consumed under auxiliary power conditions.

U.S. Pat. No. 5,427,086 by Brownell issued on Jun. 27, 1995 ("U.S. Pat. No. '086") discloses a natural gas powered forced air furnace having a thermoelectric generator for providing continuous operation during an electric power outage. U.S. Pat. No. '086 applies to a self-powered system having unlimited DC power. There are no power conservation measures disclosed in the '086 patent.

Despite the use and availability of BUP systems for HVAC systems, these systems cannot be used for an unlimited amount of time. Therefore, there remains a need to optimize the manner of operation of fossil fuel powered furnaces so as to control the cycle durations in real time during periods of reduced or no electrical power so as to optimize the useful heat supplied over the limited life of BUP systems. There remains a need to improve fossil fuel powered heating systems performance when operating under DC power with limited power availability through the use of intelligent, dwelling-specific control algorithms and by providing a user interface to override such improved control algorithms when desired. The present invention fills these and other needs as detailed more fully below.

SUMMARY OF THE INVENTION

An improved control method for fossil fuel powered heating systems during power outages and times of peak demand on an electric power grid. The life of a battery powered backup system is prolonged when attached to an HVAC system operating by such improved method. Further, increased savings may result from reducing power consumption during times of peak electric power demand. Said control method may be incorporated in the standard fossil fuel powered heating system's controller (a thermostat) or integrated within a temporary backup power system. Such control algorithm reduces the use of electrical power through adaptive cyclical control.

When a prolonged low voltage period is detected, the control algorithm sends a fossil fuel powered heating system into a short-term comfort or preliminary power conservation mode. If the outage is prolonged, the control algorithm switches to a long-term comfort or secondary power conservation mode. When a predefined number of operating cycles has occurred, the control algorithm further moves into a long-term protection or final power conservation mode until power is restored or until the backup power system energy is depleted.

The control algorithms monitor and place in memory weather data, time of day, and various characteristics of equipment operation under normal power consumption and normal power availability. In turn, these algorithms use this information to construct the backup power control scheme. Monitoring indoor, outdoor, and set point temperatures in conjunction with remaining DC power levels to optimize system performance. These algorithms provide remaining DC power duration and "time-to-freeze" estimates that, in turn, trigger homeowner notifications. In the case of an expectation of a short duration power outage, a manual override "comfort mode" option is available.

The invention accordingly comprises the features described more fully below, and the scope of the invention will be indicated in the claims. Further objects of the present invention will become apparent in the following detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 3A is a table showing the variation in heat loss from a dwelling and the operational time-of a typical heating unit for a series of stable outdoor air temperatures with an indoor air temperature set point of 55 degrees F.;

FIG. 3B is a table showing the variation in heat loss from a dwelling and the operational time-of a typical heating unit for a series of stable outdoor air temperatures with an indoor air temperature set point of 75 degrees F.;

DETAILED DESCRIPTION

While the invention is described below with respect to a preferred embodiment, other embodiments are possible. The concepts disclosed herein apply equally to other processes and methods to control HVAC and other units in order to optimize the performance of such units in conjunction with the use of temporary backup power (BUP) systems. Even though the discussion is in regard to a heating unit, the same or similar concepts and practices may be used on any HVAC or other system within the scope of the invention.

In general, the energy balance of a residential building during the heating season is a complex function of convective heat losses, losses due to infiltration of cold outside air, solar heat gains, radiant heat losses, thermal capacitance of the building materials, and conductive heat losses through the foundation. Each of these heat transfers is in turn dependent upon the construction geometry and materials. Attempting to accurately model a building based on rigorous first principles is cumbersome and specific to each dwelling. However, in order to estimate the operating time of a heating system powered by a limited source (e.g. battery pack), accurate prediction of the building heat loss is required.

A solution to this problem lies in the ability to monitor dwelling temperatures and heating equipment operation. By monitoring outdoor temperature and connecting an electronic module to a furnace's thermostat, or incorporating such a module within a thermostat, the heat loss characteristics of the dwelling may be "learned." Once learned and stored in a computer memory, this information can be used to determine optimum operating profiles when powered by a BUP system.

Figure 1:
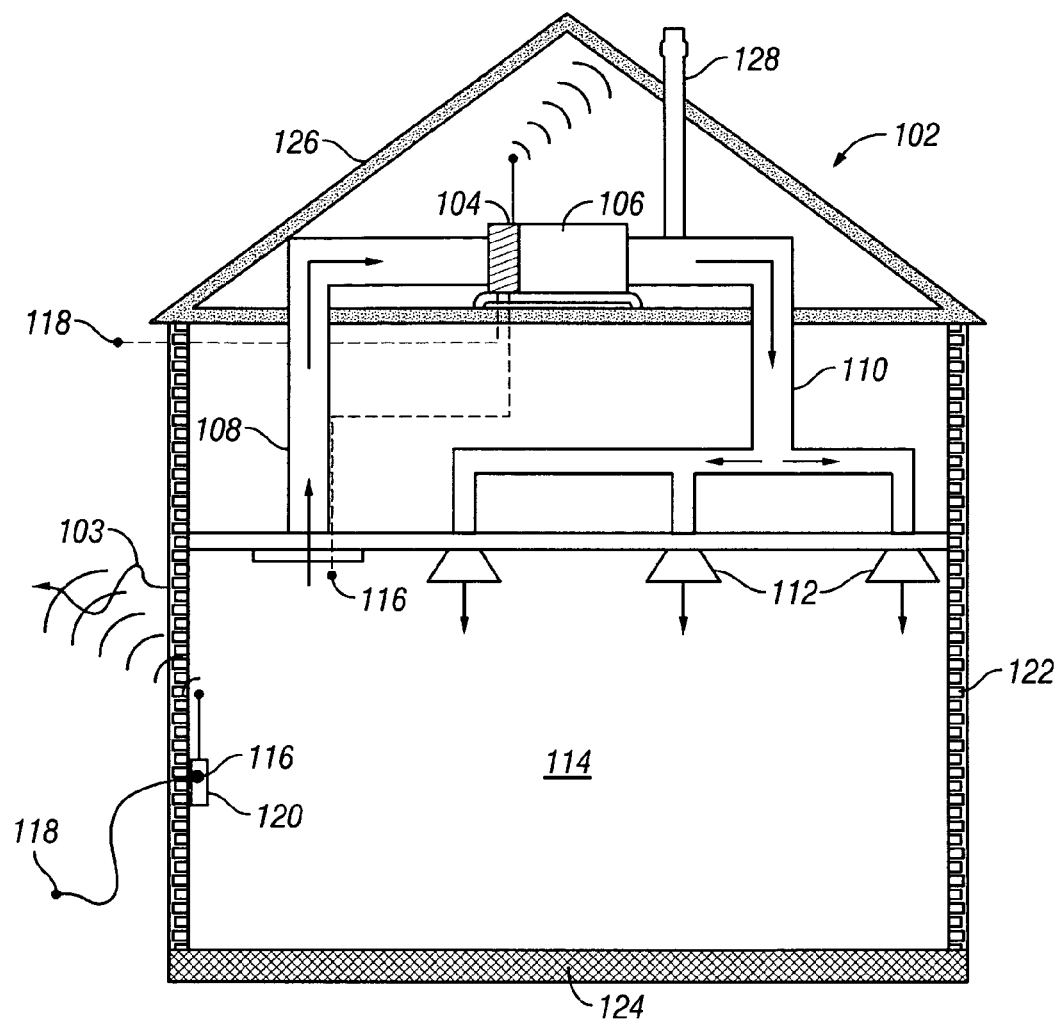
FIG. 1 is a cut-a-way view of a house equipped with means of detecting indoor and outdoor air temperatures and an intelligent thermostat according to one embodiment of the present invention.

FIG. 1 illustrates components of such a heating system for a residential dwelling. With reference to FIG. 1, a dwelling 102 loses heat 103 through its exterior walls (including doors and windows) 122, roof 126, and foundation 124. According to the invention, a BUP supply and control 104 monitors interior and exterior temperatures by electronic communication with public databases or by electrical connection to both an exterior temperature sensor 118 and an interior temperature sensor 116. In the latter case, one or both of these sensors may be assembled in the thermostat 120. The thermostat 120 controls at least a gas powered heating unit 106 whereby air is circulated from a controlled space 114 into a return air conduit 108, into the heating unit 106, into a heated air conduit 110 and through one or more heated air vents 112.

Figures 2A, 2B:
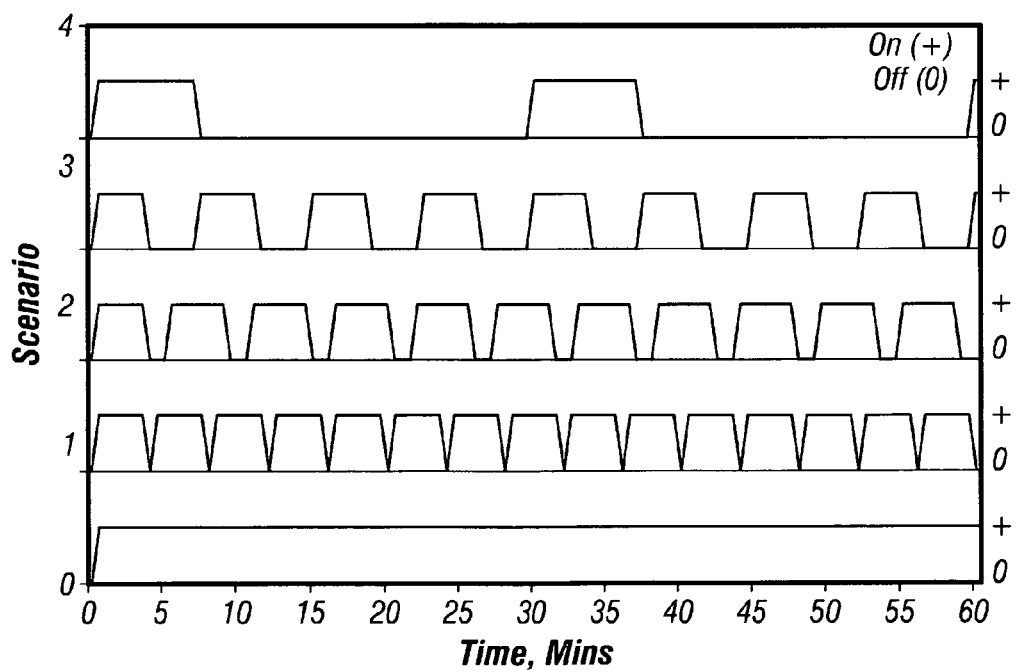
FIG. 2A is a table showing the operational times or on and off cycles of a typical heating unit for a series of outdoor air temperatures with an indoor air temperature set point of 75 degrees F. and typical thermostat differential of 1 degree F.
FIG. 2B is a graphical illustration of the operational times (on and off cycle periods) for the 5 scenarios provided in FIG. 2A.

FIG. 2A shows various times of operation of the heating unit 106 based on outdoor and indoor temperatures. With reference to FIG. 2A, for scenario 1 in which the outdoor temperature is −20 deg F. and the indoor temperature set point is 75 deg F., the heating unit 106 is operated almost continually, for example approximately 57 minutes every hour in a high heat mode. On average during this hour the heating unit experiences 14 cycles. The heating unit or cycle is off for a period of only 3 minutes each hour. In this scenario, the indoor temperature is maintained between 74 and 75 deg F. Likewise, for scenario 2 in which the outdoor temperature is 0 deg F. the indoor temperature is maintained between 74 and 75 deg F., while the heating unit 106 is operated for 45 minutes every hour in a high heat mode. The ascending scenarios correspond to higher outdoor temperatures for which the heating unit 106 is operated for decreasing amounts of time with fewer cycles. FIG. 2A also illustrates the amount of heat lost by the dwelling; and subsequently required from the heating system, depending on the outdoor air temperature. With reference to FIG. 2A, less heat is lost with an increase in outdoor air temperature. FIG. 2B illustrates the On and Off cycle times graphically for each temperature scenario presented in FIG. 2A. The data of FIG. 2A are recorded over time and are used by the control algorithms according to embodiments of the present invention.

FIG. 3A illustrates the savings in operation time for reducing the indoor temperature set point to 55 deg F., a freeze-protection setting as compared to 75 deg F. shown in FIG. 2 and repeated in part in FIG. 3B. With reference to FIG. 3A, the heat loss with an outside air temperature of −20 deg F. is reduced from 88,667 to 61,364 BTU/Hr. The operating time of the heating unit is reduced from 57 minutes to 34 minutes per hour. Similarly, the heat loss with an outside air temperature of −10 deg F. is reduced from 79,333 to 53,182 BTU/Hr with a corresponding reduction of operating time from 51 minutes to 30 minutes per hour. Likewise, for the other scenarios a reduction from 45 to 25, from 39 to 20, from 33 to 16, from 27 to 11, from 21 to 7, and from 15 to 2 minutes per hour.

Figure 4:
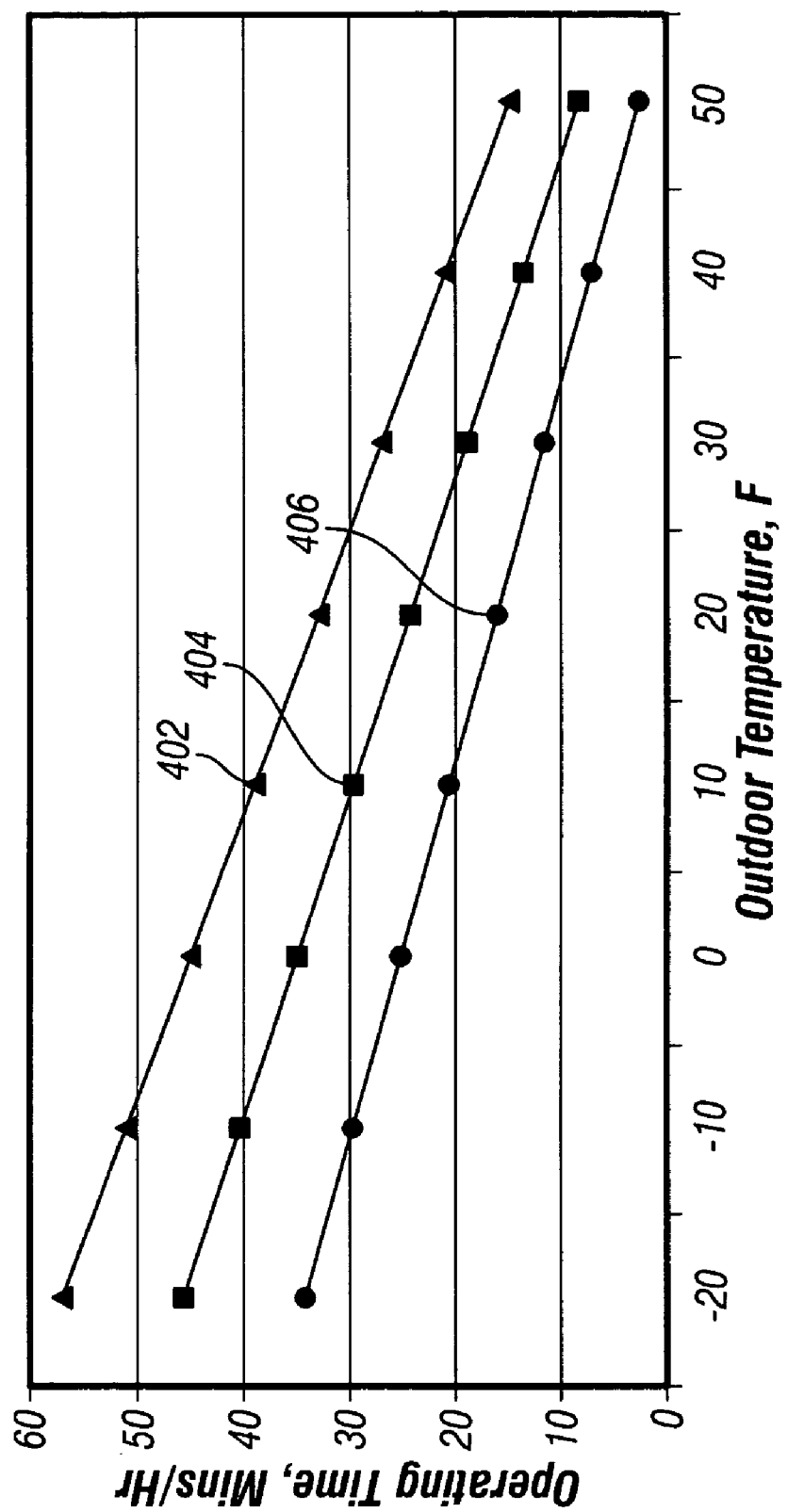
FIG. 4 is a graph showing three plots of heating unit operating time for varied indoor air temperature set points of 55, 65, and 75 degrees F. from bottom to top, respectively, over a range of steady outdoor temperatures.

The operating time of a heating unit can most simply be described as is a linear function of the differential between outdoor and indoor temperatures. FIG. 4 illustrates this relationship. The heating unit operating time is generally a linear function, or a linear approximation, for a given indoor temperature set point over a range of outdoor temperatures. With reference to FIG. 4, a first linear approximation 402 is shown by a first set of data points for an indoor temperature set point of 75 deg F. A second set 404 and third set 406 of linear approximations correspond to an indoor temperature set point of 65 deg F. and 55 deg F., respectively, with a corresponding decrease in operating time of the heating unit. The data are recorded around standard interior temperature set points usually in the range of 40 to 80 deg F. Stored data are used to create heat load profiles for a given dwelling. By storing multiple data points over various outdoor temperatures for each indoor temperature set point, a statistical analysis may be employed to estimate the heat load profile variance and to account for unmeasured disturbances resulting from solar and wind effects. Alternatively, heat load perturbations resulting from wind and solar (in terms of percentage of cloud cover) effects may be included in the heat load profiles by using data retrieved from electronic communication with public recording agencies via the internet or other communication channel.

Figure 5A:
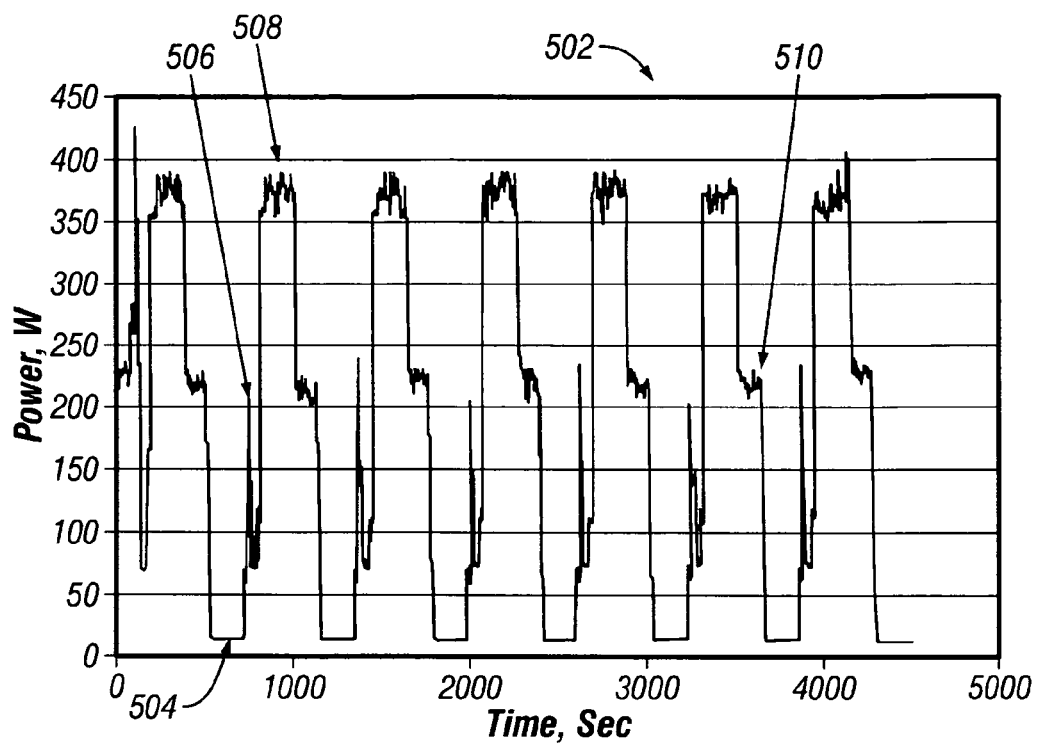
FIG. 5A is a graph showing the consumption of electrical energy as a function of time as a heating unit is cycled on and off in response to control by a prior art thermostat.

FIG. 5A illustrates the power consumption of a typical heating unit over time as it cycles on and off in 10 minute intervals. With reference to FIG. 5A, there are periods where the heating unit is off 504 and periods where the heating unit is on 508 during which the heating unit is consuming natural gas or other fuel and circulating air throughout the controlled space. There are also times when the heating unit is starting up 506 and there are corresponding spikes or fluctuations in the electrical power consumption. All power vented furnaces or heating units in the United States today are required by safety codes to provide a period at the beginning and end of a heating cycle in which the power venter (fan) operates to evacuate the heat exchanger gases while the fuel valve remains closed thereby ensuring no residual fuel remains in the heat exchanger prior to ignition. The supply air blower often operates at the end of the heating cycle after the fuel valve has been closed in a "shutdown" mode of operation. Shutdown occurs for a predetermined period of time (e.g. between 60 and 180 seconds) providing removal of the residual heat in the heat exchanger. The startup and shutdown portions or the heating cycle are detrimental to overall electrical power use because during these periods only minor heating of the controlled space is being performed.

Figure 5B:
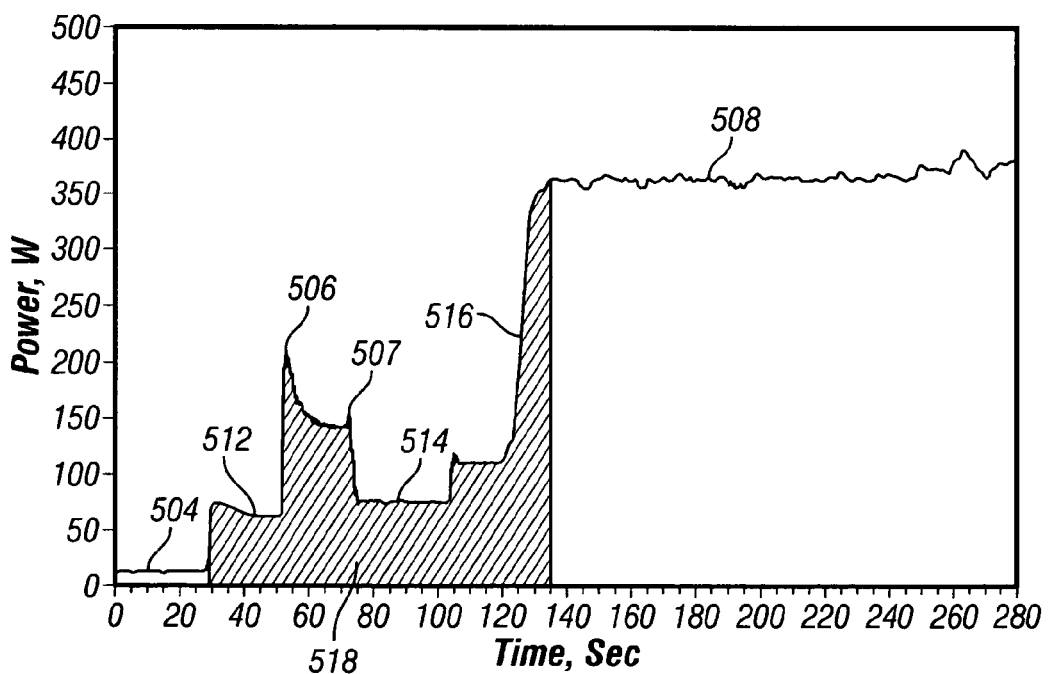
FIG. 5B is a graph showing an expanded view of a slice of the graph in FIG. 5A illustrating the consumption of electrical energy during the initial startup of the heating unit during which no heat is supplied to a dwelling.

The shaded region of FIG. 5B illustrates wasted electrical power during the startup of a typical heating unit. With reference to FIG. 5B, from the off position 504, a power venter turns on 512 followed by the activation of an ignitor 506. A gas valve 507 is opened and the ignitor power is removed 514. Additional electric energy is consumed as the supply air blower ramps up 516 before the heating unit reaches steady-state heating operation 508. The entire area under the startup region 518 represents wasted electrical power that will be required of the BUP unit. Startup normally takes about 90 seconds of the on cycle.

Figure 5C:
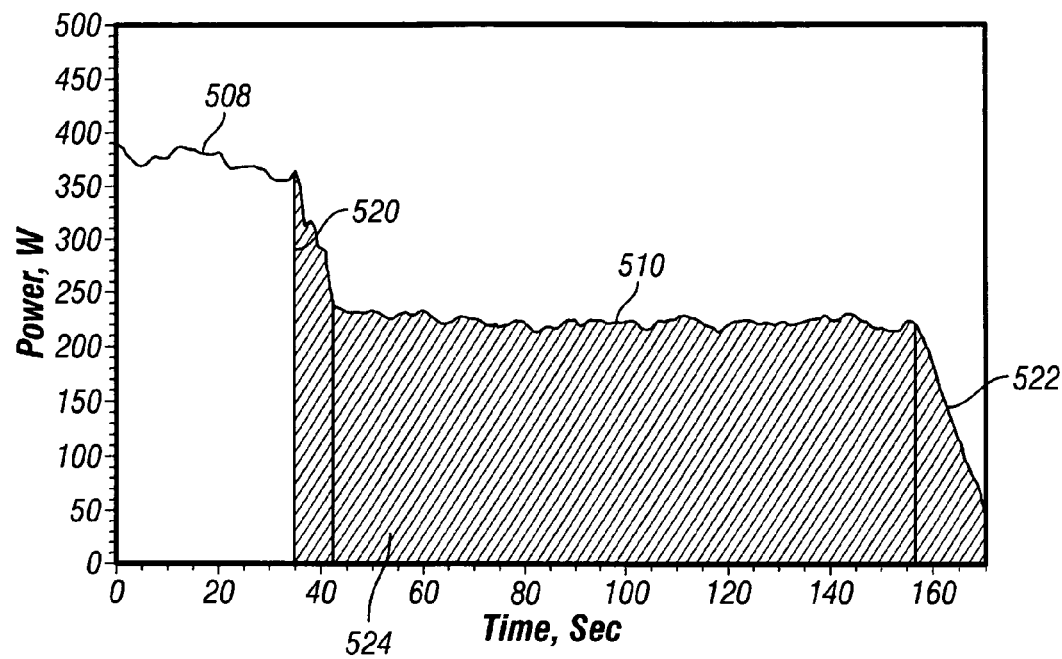
FIG. 5C is a graph showing an expanded view of a slice of the graph in FIG. 5A illustrating the consumption of electrical energy during the shutdown of a heating unit in which only a small percentage of the normal on cycle heat is supplied to a dwelling.

FIG. 5C illustrates a similar waste of electric power during shutdown of a typical heating unit. With reference to FIG. 5C, from steady-state heating operation 508, there is a post-purge period 520 and shutdown supply air blower operation 510 for approximately two minutes, during which the gas valve has been deactivated and the blower may or may not reduce speed. At the end of shutdown, the blower ramps down 522 to an off state 504. The electrical energy represented by the area under the curve 524 during the shutdown period is a further drain on a BUP unit's operating life without supplying substantial heat to the dwelling.

Figure 6:
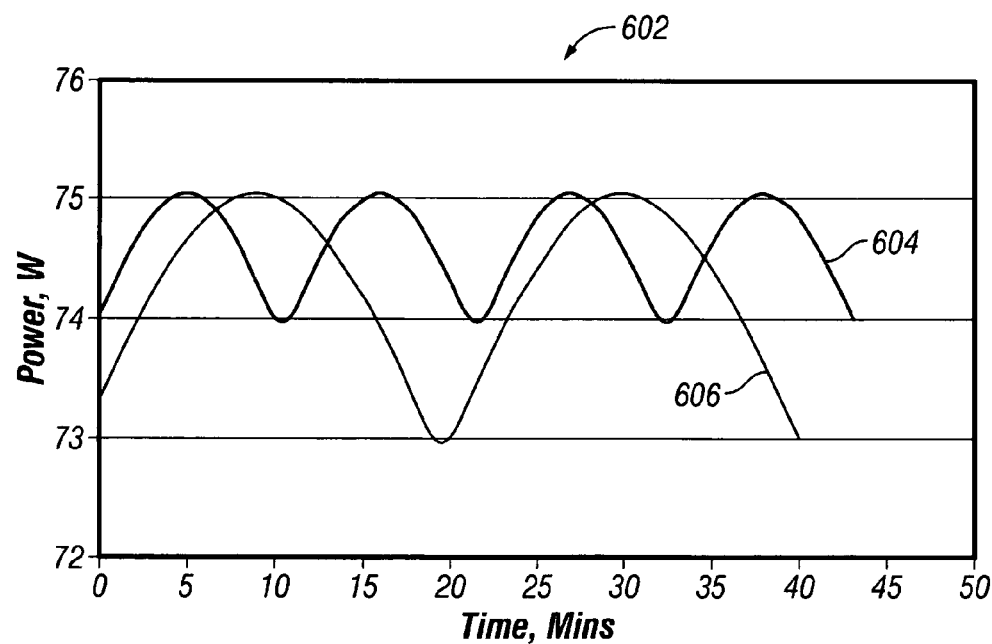
FIG. 6 is a graph showing a plot of indoor air temperature as a heating unit is operated according to a one degree F. differential temperature band (prior art) and alternatively according to a two degree F. differential temperature band. The differential temperature band may assume various values throughout the period of operation in backup power mode (present invention)

In the present invention, BUP control (BUPC) separate from or imbedded in an intelligent thermostat (IT) overrides normal heating unit operation during periods of power loss and reduces startup losses 518 and shutdown losses 524. FIG. 6 is a graph of temperature over time 602 illustrating the air temperature swing in a controlled space when controlled by a heating unit. With reference to FIGS. 2A and 2B, depending on the operating conditions a heating unit may cycle on and off with relatively high frequency 604 when controlled by a heating unit operating with a thermostat having a one degree F. differential temperature band. In FIG. 6, each time the thermostat senses a temperature drop of one degree from 75 degrees, the indoor temperature set point, the thermostat activates the heating unit, which in turn drives up the temperature from 74 degrees. There is an inherent lag or hysteresis in the heating system because it takes a certain amount of time after the start of the operation of a heating unit until a thermostat detects an increase in actual air temperature. According to the present invention, when normal electrical power is lost, a BUPC takes control away from an existing thermostat and controls a heating unit according to an electrical energy preserving algorithm. Alternatively, the algorithm may be imbedded in an IT to operate the heating unit. The BUPC may provide bidirectional communication with a backup power device and may operate it in tandem with a thermostat.

According to the present invention, a backup power control or intelligent thermostat may alter the indoor temperature set point and relax the differential temperature band so as to control a heating unit in a differential temperature band greater than the typical one degree F. The differential temperature band may be any size so as to reduce energy consumption as compared to normal operation. The temperature thusly controlled is shown as the slowly oscillating temperature 606 in FIG. 6. With fewer on and off cycles, a heating unit is operated fewer times in a given time interval thus reducing the startup and shutdown losses. When normal power is restored to the heating unit, the BUPC returns control to the thermostat so that it operates under its normal differential temperature band. Alternatively, a backup power control or an intelligent thermostat provides a mode whereby a user may set the differential temperature band depending on the user's preference. Such preference may be based on energy savings, comfort or some other reason.

Figure 7:
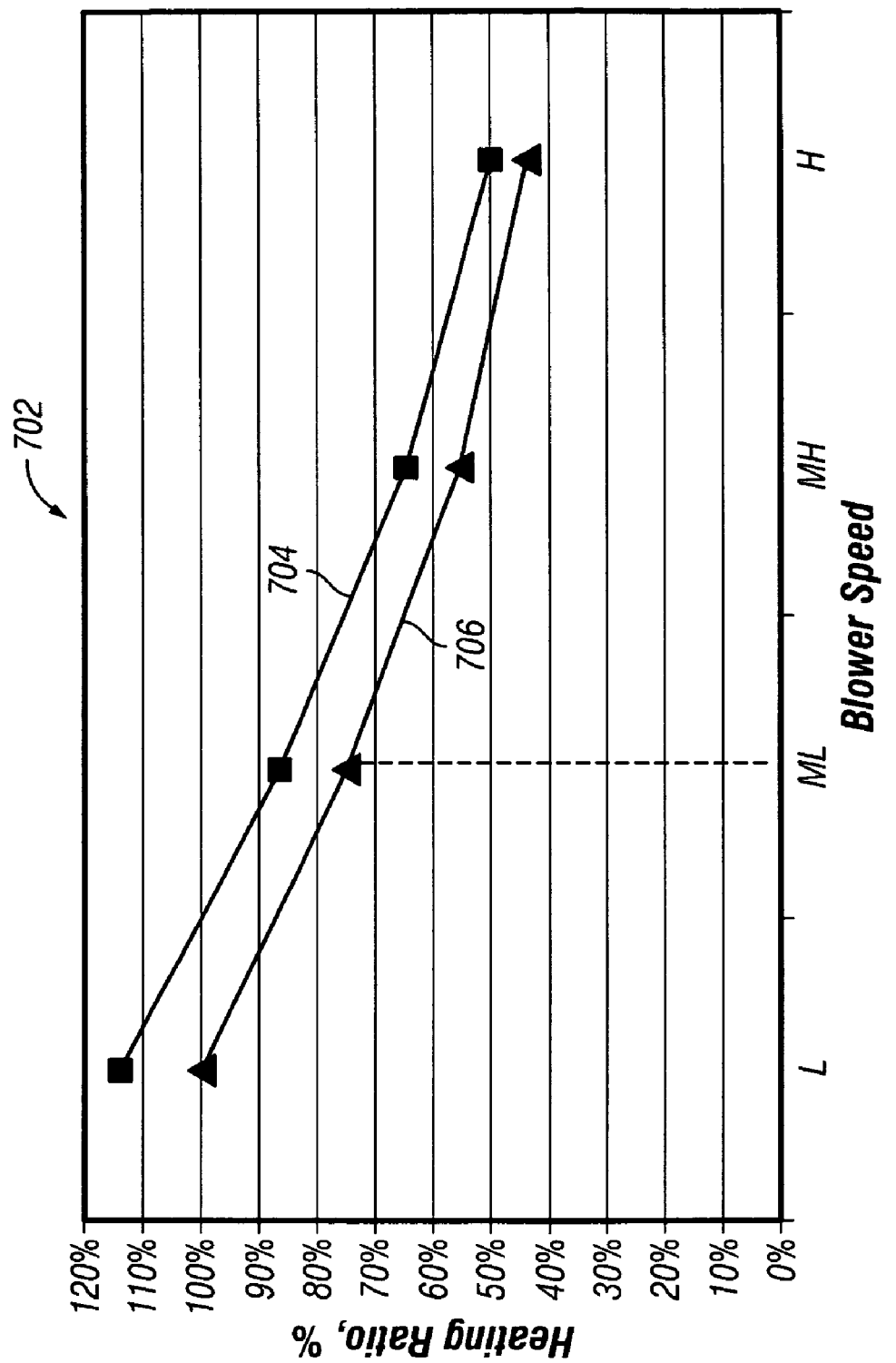
FIG. 7 is a graph of heating ratio, useful heat supplied to the dwelling relative to the electrical energy consumed by the heating unit, for high and low heating modes typical of two-stage heating units according to the prior art.

A heating ratio is defined as the amount of useful heat supplied by a furnace relative to the electrical power required to operate it. Modern heating units comprise single, two, and multi-stage furnaces. FIG. 7 is a graph 702 of the heating ratio for various blower speeds of a particular 2-stage furnace. With reference to FIG. 7, the upper curve 704 represents a high heat mode and the lower curve 706 represents a low heat mode. According to the present invention, a control algorithm records a heating unit's heating ratio at various settings. Such algorithm "learns" the heating unit's operating characteristics and calculates the associated heating ratios during normal operating conditions. During backup power operation, an intelligent control uses this information to determine the optimal operating mode. In one example, and as shown by the dotted-line in FIG. 7, a heating unit normally operates with a medium-low (ML) blower speed in both high and low heat modes. When called upon to operate in backup power mode a BUPC or intelligent thermostat selects the operating parameters that provide the greatest Heating Ratio. In this case it is the high heat mode regardless of the blower speed setting. Optimizing the Heating Ratio and altering the operating differential temperature band to reduce on and off cycles maximizes the delivery of heat to the controlled space for the limited amount of stored backup electrical energy.

Figure 8:
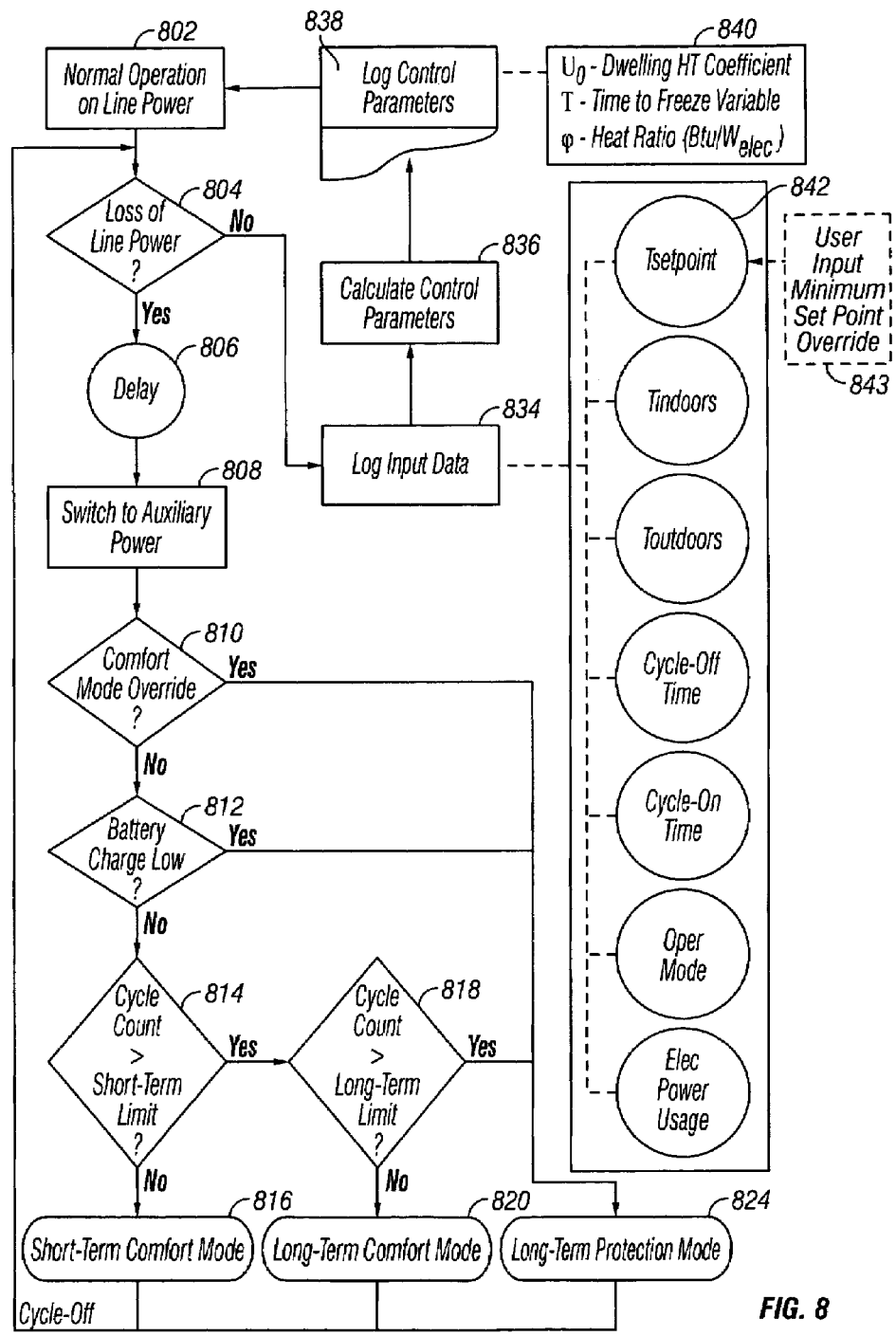
FIG. 8 is a flowchart of the logic employed by a backup power control (BUPC) to operate a fossil fuel powered furnace. This logic may be imbedded in an intelligent thermostat according to one embodiment of the present invention.

FIG. 8 illustrates the overall BUPC algorithm according to one embodiment of the present invention. Incoming voltage is constantly monitored to decide if line power is suitable for operation. The BUPC algorithm decides when to switch-over or disconnect from line to backup power, and provides appropriate delays to avoid nuisance dropouts.

With reference to FIG. 8, during normal operation 802 on electrical line power, the BUPC continually monitors whether there is a loss of electrical power 804. If not, the BUPC logs input data 834, calculates control parameters 836, and logs these parameters 838. The control parameters 840 comprise the following non-exclusive list: dwelling overall heat transfer coefficient ($U_o$), time to freeze variable (T), and heat ratio (($\phi$)). The input data 842 comprise the following non-exclusive list: indoor set point temperature, indoor air temperature, outdoor or exterior air temperature, cycle-off time, cycle-on time, operating mode, and electrical power usage. These input data 842 are recorded multiple times over time. In one embodiment, such recordings are sufficient to acquire statistically significant calculations.

With reference to FIG. 8, when line power is lost, the BUPC initiates a delay 806 before switching to auxiliary or backup electrical power 808. Next, the BUPC checks to see whether there is a comfort mode override 810. If so, the BUPC-switches into long-term protection mode 824 in which the BUPC conserves as much backup electrical energy as possible. If there is no comfort mode override, the BUPC checks to see whether the battery or alternative DC power source has a low charge 812. If so, the BUPC switches into long-term protection mode 824. If the battery or BUP unit does not have a low charge, the BUPC checks to see whether a cycle count is greater than a pre-determined short-term power outage limit 814. If so, the BUPC checks to see whether the cycle count is greater than a pre-determined long-term limit 818. If this second check is positive, then the BUPC switches into long-term protection mode 824. If the second check is negative, the BUPC switches into a long-term comfort mode 820. The BUPC in a long-term comfort mode 820 comprises increasing the differential temperature band as compared to a short-term comfort mode 816. The BUPC may take other actions in a long-term comfort mode 820 to more efficiently use the remaining electrical energy. If the BUPC determines that a cycle count is not greater than a pre-determined short-term power outage limit 814, the BUPC continues in a normal or short-term comfort mode 816. At any time during operation in the backup power mode the BUPC's indoor temperature setpoint may be overridden by user input 843.

In the present invention, a remote sensor detects and calculates indoor temperature and other variables, passing these values to a database. Further, onboard circuitry for detecting electrical power loss is part of the BUP system and includes transducers (electrical current and voltage measuring devices) to monitor and provide real-time power usage details to the database. The database is accessed during backup power operation by one or more algorithms to determine optimum on and off cycle durations. Other variables such as outdoor air temperature may be detected by remote sensors or by data retrieval from local weather stations, and such variables are similarly stored in the database.

The BPUC algorithm optimizes backup power or battery life based on predetermined dynamics that characterize the association between the furnace and house or other controlled space. Such data is continuously collected during periods in which the furnace operates under normal heating conditions powered by the electrical grid. Such data comprises heating unit cycle times (length of run time and off time), operating mode (high or low heat), indoor temperature set point, electrical power usage and corresponding indoor and outdoor temperatures.

In one embodiment, the BPUC algorithm calculates remaining battery or BUP life. The BPUC algorithm instigates test periods intermittently throughout a calendar year. Such test periods may be randomly selected or may be chosen by a user. The existing data may be manually purged so as to require the BPUC to re-acquire calibration data. The BPUC algorithm is implemented in a combination of software and hardware.

In a preferred embodiment, the BPUC device provides pure sinewave, (as opposed to mod-sine or square wave) power to the furnace during periods of auxiliary power operation.

In a further embodiment, the BPUC device is Internet, phone, or wireless/broadband enabled. Such device supports IP addressing, and monitoring of multiple appliances including their duty cycles. The BPUC device may support stack software, driver interfaces and various network protocols including wireless devices. Such BPUC device may include a central processor and at least one type of memory comprising the nonexclusive list of RAM, Flash, and ROM memory. Further, the BPUC device may comprise part of an Internet gateway or act as a router for directing operational data of appliances in the home or building to remote servers using at least one Internet protocol. In the event of sustained power loss, the BPUC device according to the present invention notifies the home or building owner of the remaining operational time period before battery decay below the operable voltage level. Notification may be by phone, email, paging, wireless/broadband or other method of communication.

In a further embodiment the BUPC allows remote access to a user who may view the heating equipment's operating mode and provide a minimum set point temperature for the conditioned space.

The foregoing discussion of the invention has been presented for purposes of illustration and description. Further, the description is not intended to limit the invention to the forms disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to use the invention as such, or in other embodiments, and with the various modifications required by their particular application or uses of the invention. It is intended that the appended claims be construed to include alternate embodiments to the extent permitted.

We claim:

1. A method for controlling a heating unit in a dwelling operating on backup electrical power comprising the steps of:
   (a) operating the heating unit according to at least one comfort mode when an estimate of remaining backup electrical power is above a threshold value; and,
   (b) operating the heating unit according to a long-term electrical power protection mode when said estimate of remaining backup electrical power is below a threshold value;
   wherein said threshold value and estimate are based upon an analysis of a database of heat loss characteristics of said heating unit in said dwelling.

2. The method of claim 1 further comprising the steps of:
   (c) operating the heating unit according to a short-term comfort mode when said estimate of remaining backup electrical power is above said threshold value and when a heating cycle count is below a pre-determined short-term limit;
   (d) operating the heating unit according to a long-term comfort mode when said estimate of remaining backup electrical power is above said threshold value, when said heating cycle count is above said pre-determined short-term limit, and when a cycle count is below a pre-determined long-term limit; and (e) operating the heating unit according to said long-term electrical power protection mode when said heating cycle count is above said pre-determined long-term limit.

3. The method of claim 2 wherein the heating unit is operated according to said long-term electrical power protection mode if a comfort mode override switch is set.

4. The method of claim 2 wherein steps (a) through (e) are performed only after said heating unit is operating on backup electrical power for a pre-determined amount of time.

5. The method of claim 2 where said short-term and long-term limits are based upon a secondary analysis of said database of heat loss characteristics of said heating unit in said dwelling.

6. The method of claim 2 where said short-term and long-term limits are manually pre-set.

7. The method of claim 2 wherein step (d)'s long-term comfort mode comprises relaxing a differential temperature band and reducing the number of heating cycles per time period from that of said short-term comfort mode.

8. The method of claim 7 wherein step (e)'s long-term protection mode comprises reducing an indoor temperature set point, further relaxing said differential temperature band and further reducing the number of heating cycles per time period from that of said long-term comfort mode.

9. The method of claim 1 wherein said database of heat loss characteristics include weather data, time of day, and an operational characteristic of said heating unit during normal power consumption in said dwelling.

10. The method of claim 9 wherein said database of heat loss characteristics include outdoor temperature, indoor temperature set point, heating unit operation time per hour, and heating unit shutoff time per hour in said dwelling.

11. The method of claim 10 wherein said database of heat loss characteristics further includes operation mode and electrical power usage.

12. The method of claim 9 wherein said weather data includes supplementary data from public recording agencies.

13. The method of claim 1 further comprising sending a notification of remaining operational time to a party prior to remaining backup electrical power drops below an operable voltage limit.

14. The Method of claim 1 further comprising remotely accessing said database of heat loss characteristics of said heating unit in said dwelling.

* * * * *